(12) United States Patent
Chang et al.

(10) Patent No.: US 10,623,619 B2
(45) Date of Patent: Apr. 14, 2020

(54) IMAGE-CAPTURE-SCOPE INDICATION DEVICE FOR IMAGE-CAPTURE APPARATUS

(71) Applicant: INTERNATIONAL BUSINESS MACHINES CORPORATION, Armonk, NY (US)

(72) Inventors: Hao Chang, Beijing (CN); Yan Zheng Sun, Beijing (CN); Lijun Wei, Beijing (CN); Qing Hong Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/373,796

(22) Filed: Apr. 3, 2019

(65) Prior Publication Data
US 2019/0230263 A1    Jul. 25, 2019

Related U.S. Application Data

(63) Continuation of application No. 14/887,500, filed on Oct. 20, 2015, now Pat. No. 10,375,281.

(30) Foreign Application Priority Data

Oct. 31, 2014    (CN) .......................... 2014 1 0601690

(51) Int. Cl.
*G02B 7/08*     (2006.01)
*H04N 5/225*    (2006.01)

(52) U.S. Cl.
CPC .............. *H04N 5/2254* (2013.01); *G02B 7/08* (2013.01); *H04N 5/2259* (2013.01); *H04N 5/225* (2013.01)

(58) Field of Classification Search
CPC ....... H04N 5/2254; H04N 5/2259; G02B 7/08
See application file for complete search history.

(56) References Cited

U.S. PATENT DOCUMENTS

| | | | |
|---|---|---|---|
| 2,816,475 A | | 12/1957 | Waller et al. |
| 4,490,029 A | * | 12/1984 | Tanaka ..................... G03B 9/64 |
| | | | 396/317 |

(Continued)

FOREIGN PATENT DOCUMENTS

| | | |
|---|---|---|
| CN | 103048853 A | 4/2013 |
| CN | 103516965 A | 1/2014 |
| WO | WO2008/059323 A1 | 5/2008 |

OTHER PUBLICATIONS

IBM Corporation, "A Position Accurate Self-Shooting Method for Camera", IP.com Disclosure No. IPCOM00016680, Jan. 24, 2008 (3 pages).

(Continued)

*Primary Examiner* — Evan P Dzierzynski
(74) *Attorney, Agent, or Firm* — Margaret A. McNamara, Esq.; Kevin P. Radigan, Esq.; Heslin Rothenberg Farley & Mesiti P.C.

(57) ABSTRACT

An image-capture-scope indication device for an image-capture apparatus. The image-capture-scope indication device includes: a light source, fixed on a surface of the image-capture apparatus on which a lens of the image-capture apparatus is provided; a light ray selection member, which is provided in front of the light source and has a light transmission portion; and a drive member. The drive member is configured for moving the light ray selection member so that a scope surrounded by light rays emitted from the light source and passing through the light transmission portion of the light ray selection member is provided that is consistent with an image-capture-scope of the image-capture apparatus.

17 Claims, 2 Drawing Sheets

(56) References Cited

U.S. PATENT DOCUMENTS

| | | | |
|---|---|---|---|
| 5,828,910 A * | 10/1998 | Lawther | G03B 15/03 |
| | | | 396/178 |
| 6,046,767 A | 4/2000 | Smith | |
| 6,788,887 B2 | 9/2004 | Takeshita et al. | |
| 7,050,084 B1 | 5/2006 | Lang | |
| 7,543,405 B1 | 6/2009 | Ivey | |
| 7,821,569 B2 * | 10/2010 | Yang | G02B 7/02 |
| | | | 348/360 |
| 8,531,590 B2 | 9/2013 | Naimark | |
| 2008/0112700 A1 | 5/2008 | Foxenland et al. | |
| 2013/0021491 A1 | 1/2013 | Lee et al. | |
| 2013/0169860 A1 | 7/2013 | Yang | |
| 2016/0127622 A1 | 5/2016 | Chang et al. | |

OTHER PUBLICATIONS

Chang et al., "List of IBM Patents and/or Patent Applications Treated as Related", U.S. Appl. No. 16/373,796, filed Apr. 3, 2019, dated Apr. 3, 2019 (2 pages).

* cited by examiner

IMAGE-CAPTURE-SCOPE INDICATION DEVICE FOR IMAGE-CAPTURE APPARATUS

BACKGROUND

An image-capture apparatus is capable of taking still images and/or videos, and thus can play an important role in people's daily life. From traditional film type to the present digital type, and from traditional manual focusing to the present eye-control tracking, continually improving techniques relating with the image-capture apparatus have brought us more and more conveniences. However, even so, traditional image-capture apparatuses may have shortcomings and be inconvenient to use in certain aspects. For example, image-capture-scope of an image-capture apparatus cannot be known in cases such as noted below, resulting in inconvenience for the photographer, as well as a person inside or outside the image-capture-scope.

For instance, when a photographer takes a self-image, a remote controller or a timer may be used to take the picture. Generally, the photographer may estimate a position through a lens of the image-capture apparatus, and then leave the image-capture apparatus to the vicinity of the estimated position; however, once the photographer leaves the image-capture apparatus, the current image-capture-scope is uncertain, and thus errors may occur.

As another example, a person inside or outside an image-capture-scope cannot know the current image-capture-scope, and so they cannot determine their own relative positions to the image-capture-scope.

In above-noted cases, the photographer, or the person inside or outside the image-capture-scope, would benefit from a convenient and fast way to determine a current image-capture-scope.

SUMMARY

In one or more aspects, an image-capture-scope indication device is provided for an image-capture apparatus. The image-capture-scope indication device includes, for instance: a light source, the light source being fixed on a surface of the image-capture apparatus on which a lens of the image-capture apparatus is provided; a light ray selection member, the light ray selection member being provided in front of the light source and having a light transmission portion; and a drive member, the drive member being configured for moving the light ray selection member so that a scope surrounded by light rays emitted from the light source and passing through the light transmission portion of the light ray selection member is consistent with an image-capture-scope of the image-capture apparatus. The light source includes a first light source, a second light source, a third light source, and a fourth light source, which are respectively provided on four different sides of the lens of the image-capture apparatus, and which are collectively arranged in a shape of a rectangle about the lens of the image-capture apparatus.

BRIEF DESCRIPTION OF THE DRAWINGS

Through the more detailed description below of certain embodiments of the present invention depicted in the accompanying drawings, the above and other objects, features and advantages of the present disclosure will become more apparent, wherein the same reference numbers throughout multiple figures generally refer to the same or similar components, and wherein.

DETAILED DESCRIPTION

Figure 1:
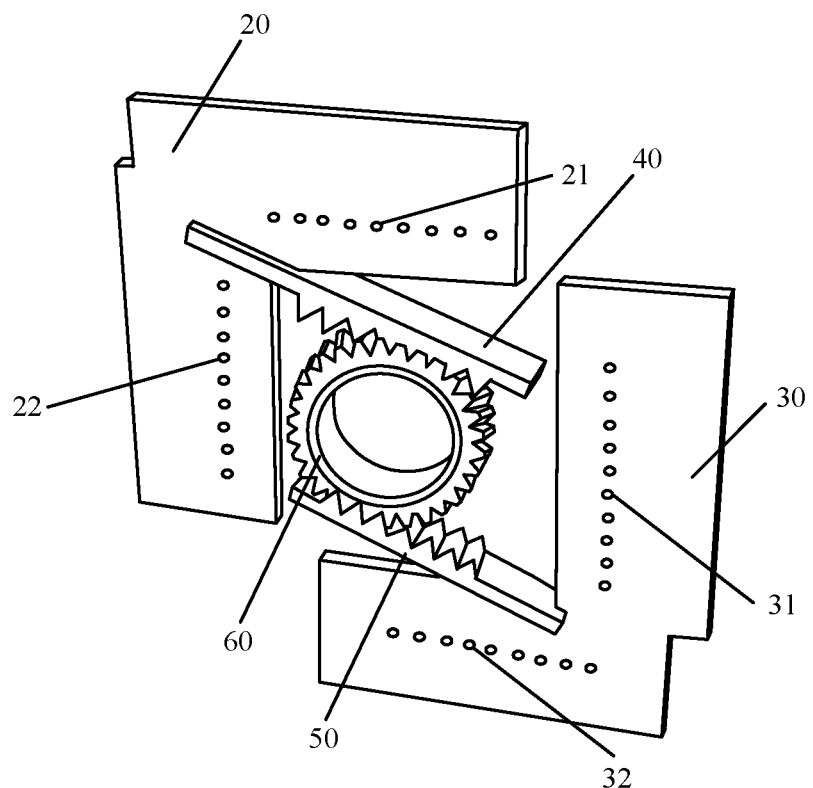
FIG. 1 is a schematic view illustrating an image-capture-scope indication device for an image-capture apparatus, according to one or more aspects of the present invention.

One or more embodiments of an image-capture-scope indication device, in accordance with one or more aspects of the present invention, are described in detail below with reference to the accompanying drawings, in which one or more embodiments of the present disclosure have been illustrated. However, the present disclosure can be implemented in various manners, and thus should not be construed to be limited to the embodiment(s) disclosed herein.

Unless otherwise defined, the technical and scientific terms used herein have the same meanings as commonly understood by one of ordinary skill in the art to which the disclosure belongs. The terms "first," "second," etc., which are used in the description and the claims of the disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

According to one or more embodiments of the disclosure, an image-capture-scope indication device of an image-capture apparatus is provided. The image-capture-scope indication device comprises: a light source, fixed on a surface of the image-capture apparatus on which a lens of the image-capture apparatus is provided; a light ray selection member, provided in front of the light source and having a light transmission portion; and a drive member, configured for moving the light ray selection member so that a scope surrounded by light rays emitted from the light source and passing through the light transmission portion of the light ray selection member is consistent with an image-capture-scope of the image-capture apparatus.

In one or more embodiments of the image-capture-scope indication device disclosed herein, the scope surrounded by the light rays emitted from the light source and passing through the light transmission portion of the light ray selection member is consistent with the image-capture-scope of the image-capture apparatus, and thus a photographer, a person inside the image-capture-scope and a person outside the image-capture-scope can directly judge and determine the current image-capture-scope of the image-capture apparatus by observing the scope surrounded by the light rays emitted from the light transmission portion. Therefore, by adopting an image-capture-scope indication device such as disclosed herein, a photographer can easily judge the location of the image-capture-scope and, thereby allowing for improvement in the quality of the resultant image. Moreover, by adopting an image-capture-scope indication device as disclosed, any person inside the image-capture-scope or a person outside the image-capture-scope can conveniently judge the current image-capture-scope at any time; and can thereby easily determine their own relative position relative to the image-capture-scope.

It should be noted that an image-capture apparatus, such discussed in the embodiments of the disclosure described herein, may be an apparatus for taking still images and/or videos, such as a camera, a video camera or any other products or components with image-capture function.

It should also be noted that the image-capture-scope of the image-capture apparatus mentioned in the embodiments of the disclosure described herein means, for instance, a maximum scope seen through the lens of the image-capture apparatus in the case that an object distance u, an image distance v and a focus f meet the relationship: $1/v=1/f-1/u$.

Figure 2:
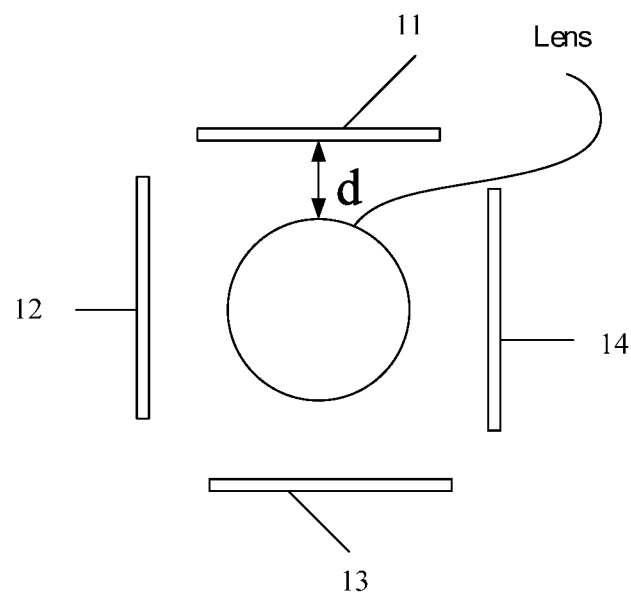
FIG. 2 is a schematic view illustrating a light source of an image-capture-scope indication device for the image-capture apparatus, according to one or more aspects of the present invention.

FIG. 1 is a schematic view illustrating one embodiment of an image-capture-scope indication device for an image-capture apparatus, according to one or more aspects of the present invention; and FIG. 2 is a schematic view illustrating a light source of an image-capture-scope indication device for the image-capture apparatus, according to one or more aspects of the present invention. With reference to FIG. 1 and FIG. 2, an image-capture-scope indication device according to one or more embodiments of the disclosure is described below.

In FIG. 1, the light source is not shown for the reason of angle of view. Referring to FIG. 2, the light source includes, in one embodiment, a first light source 11, a second light source 12, a third light source 13 and a fourth light source 14, which are respectively provided on four sides of a lens of the image-capture apparatus. For example, first light source 11 and third light source 13 extend along a horizontal direction; and second light source 12 and fourth light source 14 extend along a vertical direction. In one or more implementations, a region surrounded by first light source 11, second light source 12, third light source 13 and fourth light source 14 has a same shape and a proportional size as a negative of the image-capture apparatus. For example, the region surrounded by first light source 11, second light source 12, third light source 13 and fourth light source 14 is in a shape of a rectangle or square. Note that in the depicted example, first light source 11, second light source 12, third light source 13 and fourth light source 14 are not connected to each other (as shown in FIG. 2). Alternatively, first light source 11, second light source 12, third light source 13 and fourth light source 14 could be connected to each other (not shown); or two or three of the first light source 11, second light source 12, third light source 13 and fourth light source 14 may be connected in series (not shown).

Each of the first light source 11, second light source 12, third light source 13 and fourth light source 14 may be a scattering light source; that is, each source may have outgoing light rays at any angles within a preset angle range. By way of example, the preset angle range may be from 0 degree to 20 degree; and in that case, each of the first light source 11, second light source 12, third light source 13 and fourth light source 14 may have outgoing light rays at any angles from 0 degree to 20 degree. The light emitted from each of first light source 11, second light source 12, third light source 13 and fourth light source 14 may be visible light. For example, the light emitted from each of first light source 11, second light source 12, third light source 13 and fourth light source 14 may be visible monochromatic light, such as red, blue or green light.

With reference to FIG. 2, a distance "d" may be provided between first light source 11 and the lens of the image-capture apparatus; for example, d is from 1 cm to 8 cm. Furthermore, there exists a distance between second light source 12, third light source 13, fourth light source 14 and the lens of the image-capture apparatus, respectively. In order to simplify the manufacture process, the distances between first light source 11, second light source 12, third light source 13, fourth light source 14 and the lens of the image-capture apparatus may be equal to each other, as shown in FIG. 2. However, in practice, the distances between first light source 11, second light source 12, third light source 13, fourth light source 14 and the lens of the image-capture apparatus may be different from each other. Note, in this regard, that operation of the image-capture-scope indication device will not be obviously influenced even through the distances between first light source 11, second light source 12, third light source 13, fourth light source 14 and the lens of the image-capture apparatus are different from each other, which will be described below in detail.

In one or more implementations, each of first light source 11, second light source 12, third light source 13 and fourth light source 14 may be a line light source, such as a light tube as shown in FIG. 2.

Alternatively, each of the first light source 11, second light source 12, third light source 13 and fourth light source 14 is a spot light source or a combination of a plurality of spot light sources.

It should be noted that, sizes of first light source 11, second light source 12, third light source 13 and fourth light source 14 may be substantially the same to each other, as shown in FIG. 2. However, in practice, the sizes of first light source 11, second light source 12, third light source 13 and fourth light source 14 may be alternatively different from each other.

Referring to FIG. 1, the light ray selection member may include a first light ray selection member 20 and a second light ray selection member 30; with a first light transmission portion 21 and a second light transmission portion 22 being provided on first light ray selection member 20; and a third light transmission portion 31 and a fourth light transmission portion 32 being provided on the second light ray selection member 30.

The first light transmission portion 21, second light transmission portion 22, third light transmission portion 31 and fourth light transmission portion 32 are associated with or correspond to first light source 11, second light source 12, third light source 13 and fourth light source 14, respectively. More specifically, extension directions of the first light transmission portion 21, second light transmission portion 22, third light transmission portion 31 and fourth light transmission portion 32 are respectively same as those of first light source 11, second light source 12, third light source 13 and fourth light source 14. As noted above, the drive member is configured for moving the light ray selection member; and in this case, the movement ranges of first light transmission portion 21, second light transmission portion 22, third light transmission portion 31 and fourth light transmission portion 32 are required to at least partially overlap with the light ray ranges of first light source 11, second light source 12, third light source 13 and fourth light source 14, respectively.

By way of example, the first light ray selection member 20 is in a shape of L; and first light transmission portion 21 and second light transmission portion 22 are respectively provided on the two sides of the L shape, as shown in FIG. 1. Further, second light ray selection member 30 is also shown in a shape of L; and third light transmission portion 31 and fourth light transmission portion 32 are respectively provided on the two sides of the L shape.

In one or more implementations, first light transmission portion 21, second light transmission portion 22, third light transmission portion 31 and fourth light transmission portion 32 are formed of small holes in a row, respectively. The distances between the small holes may be even or uneven. Furthermore, first light transmission portion 21, second light transmission portion 22, third light transmission portion 31 and fourth light transmission portion 32 may be in other forms, such as slit, transmission film or the like.

Referring to FIG. 1, the drive member may comprise a first connector 40, a second connector 50 and a gear 60. First connector 40 may be fixed to first light ray selection member 20, second connector 50 may be fixed to second light ray selection member 30 and gear 60 is provided between first connector 40 and second connector 50, so that gear 60 drives first connector 40 and second connector 50 to move when the gear 60 rotates. First connector 40 and second connector 50 respectively drive first light ray selection member 20 and second light ray selection member 30 to move.

As an example, first connector 40 and second connector 50 may be formed as straight plates. For example, patterns capable of engaging with gear 60 can be provided on a surface of first connector 40 facing gear 60, so as to engage first connector 40 with gear 60, and patterns capable of engaging with gear 60 may be provided on a surface of second connector 50 facing gear 60, so as to engage second connector 50 with gear 60.

In the depicted example, an extension direction of first connector 40 is in parallel with that of second connector 50.

As described above, first light ray selection member 20 and second light ray selection member 30 may be in the shape of L, and in such case, first connector 40 may be provided between two sides of the L-shaped first light ray selection member 20 and second connector 50 may be provided between two sides of the L-shaped second light ray selection member 30. For example, an angle between the first connector 40 and each side of the L-shaped first light ray selection member 20 may be 45 degrees, and an angle between second connector 50 and each side of L-shaped second light ray selection member 30 is 45 degrees.

In one or more embodiments, gear 60 is coaxial with the lens of the image-capture apparatus and is bonded with the lens of the image-capture apparatus. The gear 60 being coaxial with the lens means that a central axis of the gear 60 coincides with an optical axis of the lens. Gear 60 may be directly or indirectly bonded with the lens. For example, inside threads may be provided on the inner wall of the gear 60, and corresponding outside threads may be provided on the lens with the inside threads engaging with the outside threads so that gear 60 is directly bonded with the lens. For example, inside threads may be provided on the inner wall of gear 60, and inside threads may also be provided on the lens; both of inside threads of gear 60 and inside threads of the lens engage with corresponding outside threads formed on a shaft, so that gear 60 is indirectly bonded with the lens.

It should be noted that, the method for bonding gear 60 with the lens is not limited to adopting inside threads and outside threads described as above, and any known bonding method may be adopted.

In the case that the gear is coaxial with the lens of the image-capture apparatus and is bonded with the lens of the image-capture apparatus, the lens is capable of driving the gear to rotate clockwise or counter-clockwise when the lens moves backward or forward to perform a focusing action. In this way, the lens is capable of driving the drive member to move when the lens moves backward and forward to perform the focusing action, and then the drive member drives the light ray selection member to move. Therefore, the image-capture-scope indication device according to the embodiments of the disclosure can operate without adding an exclusive power source.

Referring to FIG. 1, when gear 60 rotates clockwise, first connector 40 and second connector 50 drive first light ray selection member 20 and second light ray selection member 30 so that the first light ray selection member 20 and the second light ray selection member 30 gradually close to each other; and at this time, a scope surrounded by the light rays passing through first light transmission portion 21, second light transmission portion 22, third light transmission portion 31 and fourth light transmission portion 32 is reduced. When gear 60 rotates counter-clockwise, first connector 40 and second connector 50 drive first light ray selection member 20 and second light ray selection member 30 so that first light ray selection member 20 and second light ray selection member 30 gradually move away from each other, and at this time, the scope surrounded by the light rays passing through first light transmission portion 21, second light transmission portion 22, third light transmission portion 31 and fourth light transmission portion 32 is enlarged.

As described above, in an image-capture-scope indication device according to the embodiments of the present disclosure, the drive member drives the light ray selection member to move, so that the relative position between the light ray selection member and the light source changes and the outgoing angle of the light rays passing through the light transmission portion of the light ray selection member changes as well. In this way, the light rays passing through the light transmission portion of the light ray selection member are selected by the drive member driving the light ray selection member to move. In order that the scope surrounded by the light rays passing through the light transmission portion of the light ray selection member is consistent with the image-capture-scope of the image-capture apparatus, the light rays passing through the light transmission portion of the light ray selection member will have a specific outgoing angle B. Hereinafter, the outgoing angle B will be determined in conjunction with FIG. 3 and FIG. 4.

Figure 3:
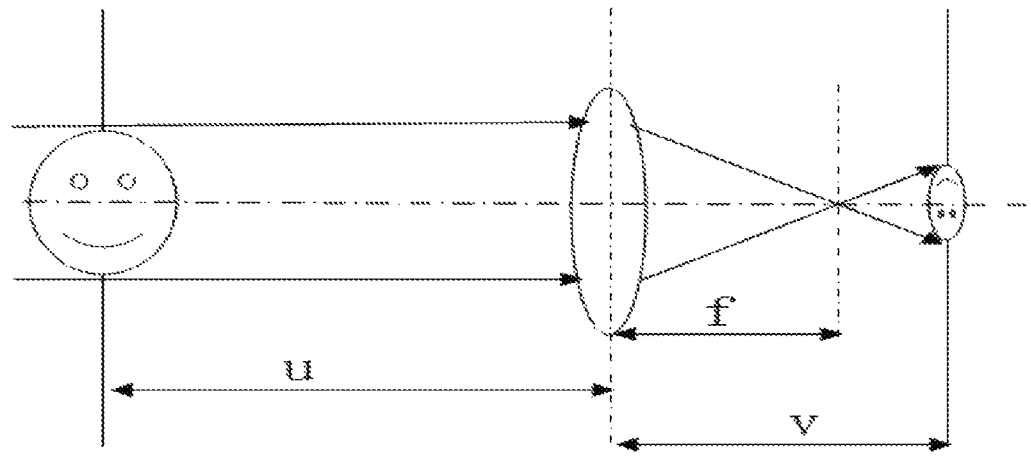
FIG. 3 is a light path schematic illustrating an image-capture principle of a camera, useful in understanding an image-capture-scope indication device, according to one or more aspects of the present invention.

FIG. 3 is a light path schematic view illustrating an image-capture principle of a camera. In order to obtain a clear image, the object distance u, the image distance v and the focus f meet the relationship:

$$1/v = 1/f - 1/u \quad (1)$$

Besides, for the image-capture apparatus, the maximum scope (namely, image-capture-scope) seen through the lens may be expressed by a visual angle A; and the relationship between the visual angle A and the focus f is:

$$A = 2 \times \arctan(D/2f) \quad (2)$$

Where arc tan is the arc tangent function, and D is a length of a diagonal line of the negative of the image-capture apparatus. It can be seen that the larger the focus is, the smaller the visual angle is; on the contrary, the smaller the focus is, the larger the visual angle is.

Figure 4:
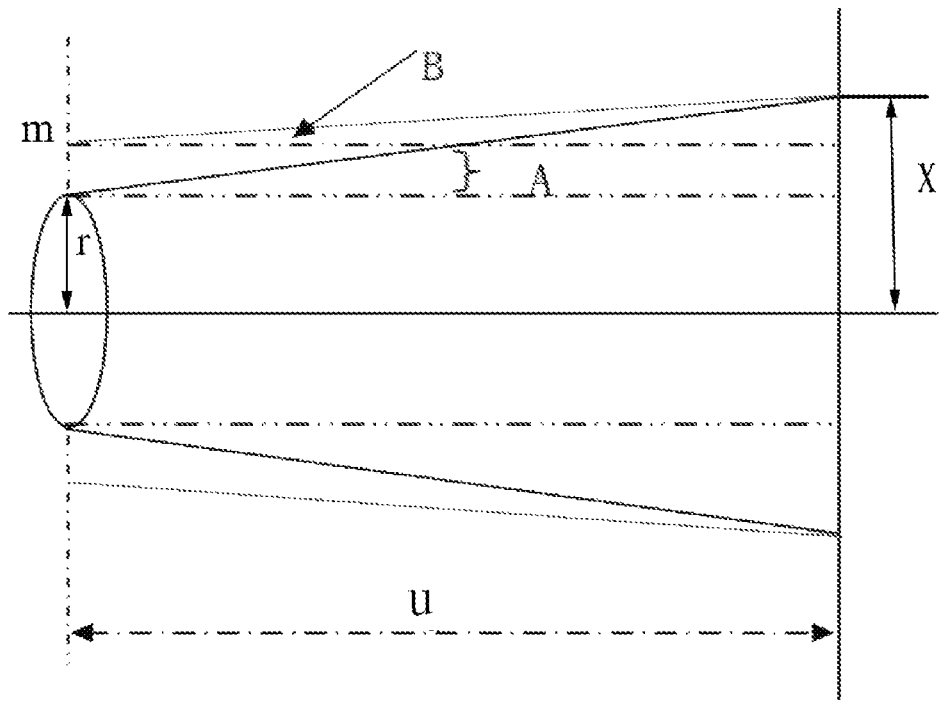
FIG. 4 is a light path schematic for determining an outgoing angle B of light rays emitted from the light source and passing through a light transmission portion of a light ray selection member, useful in understanding an image-capture-scope indication device, according to one or more aspects of the present invention.

FIG. 4 is a light path schematic view for determining the outgoing angle B of light rays emitted from the light source and passing through the light transmission portion of the light ray selection member. Referring to FIG. 4, in order that the scope surrounded by the light rays passing through the light transmission portion of the light ray selection member is consistent with the image-capture-scope of the image-capture apparatus, the outgoing angle B of the light rays passing through the light transmission portion will meet the following relationship:

$$\text{Tan } B=(X-m)/u \quad (3)$$

$$X=u^*\tan A+r \quad (4)$$

Where X is a radius of the image-capture-scope; m is a distance between the light source and a center of the lens; r is a radius of the lens. In combination with the previous descriptions, it can be known that m is a sum of the radius r of the lens and the distance d between the light source and the lens, namely, m=r+d.

The relationship formula (4) is substituted into the relationship formula (3) to obtain:

$$\text{Tan } B=(X-m)/u=(u^*\tan A+r-m)/u \quad (5)$$

Further, in conjunction with the relationship formula m=r+d, it can be obtained through the relationship formula (5) that:

$$B=\text{arc tan}((^*\tan A+r-m)/u)=\text{arc tan}((^*\tan A-d)/u) \quad (6)$$

If it continues, we can see that tan A can be replaced by variables D and f; finally, it can be obtained that the outgoing angle B is a function of D, f, u (as described above, d is a fixed value); the dependence relationship of the outgoing angle B on D, f, u can be mathematically modeled. It can be seen that the outgoing angle B is only determined by D and f when the object distance u is given.

Further, the distance d between the light source and the lens is far less than the object distance u, so the outgoing angle B is approximately equal to the visual angle A according to the formula (6):

$$B\approx A=2^*\text{arc tan}(D/2f) \quad (7)$$

In practice, the distance d between the light source and the lens generally is far less than the object distance u, so the outgoing angle B can be approximately calculated according to formula (7).

When the image-capture-scope indication device according to the embodiments of the disclosure is adopted, the outgoing angle B is firstly calculated according to formula (6) or (7); and then the drive member is controlled to drive the light ray selection member to move, so that the light rays with the outgoing angle B are selected to pass through the light transmission portion of the light ray selection member. In this way, the scope surrounded by the light rays passing through the light transmission portion is consistent with the image-capture-scope of the image-capture apparatus. For example, the image-capture-scope indication device according to the embodiments of the disclosure further comprises a control member, and the control member is in signal connection with the drive member. When the image-capture apparatus takes the image, the control member determines the outgoing angle B according to formula (6) or (7), and then controls the drive member to drive the light ray selection member to move according to the determined outgoing angle B.

In an image-capture-scope indication device according to one or more embodiments of the present disclosure, the scope surrounded by the light rays emitted from the light source and passing through the light transmission portion of the light ray selection member is consistent with the image-capture-scope of the image-capture apparatus, and thus a photographer, person inside the image-capture-scope and/or person outside the image-capture-scope can directly judge and determine the current image-capture-scope of the image-capture apparatus by observing the scope surrounded by the light rays emitted from the light transmission portion. Therefore, by adopting the image-capture-scope indication device according to one or more aspects of the present invention, the photographer can easily judge the location of the image-capture-scope and thereby improve the quality of the resultant image. Moreover, by adopting an image-capture-scope indication device as disclosed herein, any person inside the image-capture-scope and/or a person outside the image-capture-scope can conveniently judge the current image-capture-scope at any time; and can thereby easily determine their own position relative to the image-capture-scope.

Besides, it can be seen from the formulas (6) and (7) that the influence of the distance d between the light source and the lens on the outgoing angle B can be nearly ignored for the distance d between the light source and the lens is far less than the object distance u, and it is just the reason why the distances between the first light source 11, the second light source 12, the third light source 13, the fourth light source 14 and the lens may be equal to or different from each other.

It should be noted that, the image-capture-scope indication device according to the embodiments of the disclosure may be provided with a switch; thus the image-capture-scope indication device can be conveniently controlled to be in a working state or not in a working state.

It should be noted that, the image-capture-scope indication device according to the embodiments of the disclosure may be remotely controlled; thereby the image-capture-scope indication device can be conveniently controlled from a remote place.

It should be noted that, the image-capture-scope indication device according to the embodiments of the disclosure may be mounted outside or inside the shell of the image-capture apparatus. When the image-capture-scope indication device is installed inside the shell, a portion of the shell corresponding to the image-capture-scope indication device is made of a transparent material.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An image-capture-scope indication device for an image-capture apparatus, comprising:
   a light source, the light source being fixed on a surface of the image-capture apparatus on which a lens of the image-capture apparatus is provided;

a light ray selection member, the light ray selection member being provided in front of the light source and having a light transmission portion;

a drive member, the drive member being configured for moving the light ray selection member so that a scope surrounded by light rays emitted from the light source and passing through the light transmission portion of the light ray selection member is consistent with an image-capture-scope of the image-capture apparatus; and wherein the light source comprises a first light source, a second light source, a third light source and a fourth light source, which are respectively provided on four different sides of the lens of the image-capture apparatus, and which are collectively arranged in a shape of a rectangle about the lens of the image-capture apparatus.

2. The image-capture-scope indication device of claim 1, wherein:

the light ray selection member comprises a first light ray selection member and a second light ray selection member;

a first light transmission portion and a second light transmission portion are provided on the first light ray selection member;

a third light transmission portion and a fourth light transmission portion are provided on the second light ray selection member; and the first light transmission portion, the second light transmission portion, the third light transmission portion and the fourth light transmission portion are associated with the first light source, the second light source, the third light source and the fourth light source, respectively.

3. The image-capture-scope indication device of claim 2, wherein extension directions of the first light transmission portion, the second light transmission portion, the third light transmission portion and the fourth light transmission portion are respectively same as those of the first light source, the second light source, the third light source and the fourth light source.

4. The image-capture-scope indication device of to claim 2, wherein:

the drive member comprises a first connector, a second connector and a gear;

the first connector is fixed to the first light ray selection member, and the second connector is fixed to the second light ray selection member; and the gear is provided between the first connector and the second connector, so that the gear drives the first connector and the second connector to move when the gear rotates, and then, the first connector and the second connector respectively drive the first light ray selection member and the second light ray selection member to move.

5. The image-capture-scope indication device of claim 4, wherein:

patterns capable of engaging with the gear are provided on a surface of the first connector facing the gear, so as to engage the first connector with the gear; and patterns capable of engaging with the gear are provided on a surface of the second connector facing the gear, so as to engage the second connector with the gear.

6. The image-capture-scope indication device of claim 4, wherein the gear is coaxial with the lens and is bonded with the lens.

7. The image-capture-scope indication device of claim 6, wherein the lens drives the drive member to move when the lens moves backward or forward to perform a focusing action.

8. The image-capture-scope indication device of claim 4, wherein when the gear rotates clockwise, the first connector and the second connector drive the first light ray selection member and the second light ray selection member so that the first light ray selection member and the second light ray selection member gradually close to each other; and upon closing, a scope surrounded by the light rays passing through the first light transmission portion, the second light transmission portion, the third light transmission portion and the fourth light transmission portion is reduced.

9. The image-capture-scope indication device of claim 4, wherein when the gear rotates counterclockwise, the first connector and the second connector drive the first light ray selection member and the second light ray selection member so that the first light ray selection member and the second light ray selection member gradually become away from each other; and at this time, the scope surrounded by the light rays passing through the first light transmission portion, the second light transmission portion, the third light transmission portion and the fourth light transmission portion is enlarged.

10. The image-capture-scope indication device of claim 1, wherein each of the first light source, the second light source, the third light source and the fourth light source is a scattering light source.

11. The image-capture-scope indication device of claim 1, wherein a light emitted from each of the first light source, the second light source, the third light source and the fourth light source is visible light.

12. The image-capture-scope indication device of claim 1, wherein a region surrounded by the first light source, the second light source, the third light source and the fourth light source has a same shape and a proportional size as a negative captured by the image-capture apparatus.

13. The image-capture-scope indication device of claim 1, wherein the light rays emitted from the light source and passing through the light transmission portion of the light ray selection member has an outgoing angle B, and the outgoing angle B meets a relationship as below:

$$B = \text{arc tan}((u^* \tan A - d)/u); \text{ and}$$

$$A = 2 \times \text{arc tan}(D/2f)$$

where u is an object distance; d is a distance between the light source and the lens of the image-capture apparatus; A is a visual angle; D is a length of a diagonal line of the negative of the image-capture apparatus, and f is a focus.

14. The image-capture-scope indication device of claim 13, wherein:

the image-capture-scope indication device further comprises a control member, and the control member is in signal connection with the drive member; and when the image-capture apparatus takes an image, the control member determines the outgoing angle B by calculation, and then controls the drive member to drive the light ray selection member to move according to the determined outgoing angle B.

15. The image-capture-scope indication device of claim 1, wherein the light rays emitted from the light source and passing through the light transmission portion of the light ray selection member has an outgoing angle B, and the outgoing angle B meets a relationship as below:

$$R \approx 2 * \arctan(D/2f)$$

where D is a length of a diagonal line of the negative of the image-capture apparatus, and f is a focus.

16. The image-capture-scope indication device of claim 15, wherein:
   the image-capture-scope indication device further comprises a control member, and the control member is in signal connection with the drive member; and
   when the image-capture apparatus takes an image, the control member determines the outgoing angle B by calculation, and then controls the drive member to drive the light ray selection member to move according to the determined outgoing angle B.

17. The image-capture-scope indication device of claim 1, wherein the image-capture-scope indication device is installed inside a shell of the image-capture apparatus, and a portion of the shell corresponding to the image-capture-scope indication device is made of a transparent material.

\* \* \* \* \*